United States Patent [19]

Matsumoto et al.

[11] Patent Number: 4,837,268

[45] Date of Patent: Jun. 6, 1989

[54] WHOLLY AROMATIC POLYESTER

[75] Inventors: Mitsuo Matsumoto, Kurashiki; Teruhisa Kaneda, Osaka, both of Japan

[73] Assignee: Kuraray Company, Ltd., Kurashiki, Japan

[21] Appl. No.: 134,754

[22] Filed: Dec. 18, 1987

[30] Foreign Application Priority Data

Dec. 29, 1986 [JP] Japan ................... 61-310917

[51] Int. Cl.$^4$ .............. C08L 67/02; C08F 20/00; C08G 63/18
[52] U.S. Cl. ................... 524/539; 524/605; 525/444; 525/450; 528/193
[58] Field of Search ............ 528/193; 524/539, 605; 525/444, 450

[56] References Cited

U.S. PATENT DOCUMENTS

| | | | |
|---|---|---|---|
| 3,773,858 | 11/1973 | Nowak et al. | 528/193 |
| 4,247,514 | 1/1981 | Luise | 528/193 |
| 4,269,965 | 5/1981 | Irwin | 528/193 |
| 4,299,756 | 11/1981 | Calundann | 528/193 |
| 4,355,134 | 10/1982 | Charbonneau et al. | 524/605 |
| 4,451,611 | 5/1984 | Cincotta et al. | 525/444 |
| 4,563,508 | 1/1986 | Cottis et al. | 525/450 |

FOREIGN PATENT DOCUMENTS 1507207  4/1978  United Kingdom .

*Primary Examiner*—Lewis T. Jacobs
*Attorney, Agent, or Firm*—Oblon, Fisher, Spivak, McClelland & Maier

[57] ABSTRACT

A molded product prepared by injection molding a wholly aromatic thermotropic liquid crystal polyester consisting of 4-oxybenzoil moiety, terephthaloyl moiety and 4,4'-dioxydiphenyl ether moiety is characterized in high impact strength, small mechanical anisotropy and excellent resistance to heat. The thermotropic liquid crystal polyester gives, by blending therewith a known thermotropic liquid crystal polyester, a composition which can yield a formed product having a superior strength and a relatively small elastic modulus.

22 Claims, 2 Drawing Sheets

WHOLLY AROMATIC POLYESTER

BACKGROUND OF THE INVENTION

This invention relates to a wholly aromatic thermotropic liquid crystal polyester consisting of 4-oxybenzoyl units, terephthaloyl units and 4,4'-dioxydiphenyl ether units in a specified construction, to a molded product obtained by injection molding said polyester having high impact strength, and further to a blend of said polyester with so far proposed thermotropic liquid crystal polyesters.

Recently research and development have been actively carried out on polyesters forming optically anisotropic melt phase, i.e. thermotropic liquid crystal polyester, and some of them have started being industrially produced.

Since a thermotropic liquid crystal polyester has a tendency to readily orient to a great extent up melt processing, the injection molding of the polyester gives a molded product highly oriented in one direction (machine direction) having mechanical properties such as strength and elastic modulus much higher than those of molded products obtained from conventional polymeric compounds not forming liquid crystal.

It is known that among liquid crystal polyesters wholly aromatic thermotropic liquid crystal polyesters give formed products having both markedly high strengths and elastic moduli as well as being excellent in thermal characteristics.

However, injection molded products obtained from thermotropic liquid crystal polyesters are in usual cases do not always have markedly high impact strength. Further since such molded products are highly oriented in one direction, mechanical properties such as strength and elastic modulus in the direction of flow (machine direction) greatly differ from those in the direction perpendicular to that direction, showing anisotropy, and therefore they suffer a great restriction in use as product. In usual cases a filler such as glass fiber is incorporated when subjected to molding to reduce such anisotropy. It is known that in this case the impact strength of the molded product obtained decreases remarkably. Accordingly for uses where high impact strength is required a molded product obtained from a thermotropic liquid crystal polyester is not entirely suitable.

On the other hand, polycarbonates have been known as polymeric materials giving the moldings with remarkably high impact strength. However the polycarbonates are inferior in resistance to hydrolysis and resistance to organic solvent, and so when contacted with for example an organic solvent readily produce cracks, whereby the use is limited. Further the polycarbonate is, as a high performance polymer, not sufficient in heat resistance, and is not entirely good in moldability.

Further, as described before, formed products obtained from thermotropic liquid crystal polyesters have, compared to those obtained from polymeric compounds not forming liquid crystal, much higher strength and elastic modulus and lower elongation. However, for certain end-uses there is required a high strength combined with a relatively low elastic modulus or a high elongation. For example for a sealing agent for integrated circuits of electronics parts, there is desired a high flexural strength simultaneously with a low elastic modulus for rendering internal stress low.

An object of this invention is to provide a wholly aromatic thermotropic liquid crystal polyester which gives injection molded products having markedly high impact strength and heat resistance, as well as high resistance to solvents.

Another object of this invention is to provide a blend of a melt-processable thermotropic liquid crystal polyester which gives various formed products which are, while superior in strength, relatively low in elastic modulus, relatively high in breaking elongation, and excellent in toughness, as well as excellent in thermal characteristics.

SUMMARY OF THE INVENTION

A wholly aromatic polyester according to the present invention is the one consisting essentially of recurring units I, II and III:

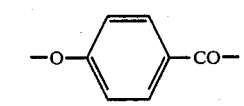

I.

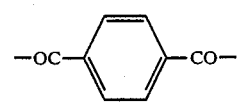

II.

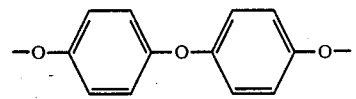

III.

wherein the unit I is contained in the range from 45 to 68 mol %, the unit II is contained in the range from 16 to 27.5 mol %, the unit III is contained in the range from 16 to 27.5 mol %, and the unit II and the unit III exist in substantially the same molar amounts; having an inherent viscosity, when determined in pentafluorophenol solution with a concentration of 0.1 wt./vol % and at 60° C., of 0.5 dl/g or higher; and forming an optically anisotropic melt phase at a temperature below 350° C.

Another object of this invention is to provide a molded product being of a small anisotropy in mechanical properties and being excellent in impact strength.

Still another object of this invention is to provide a polymer composition obtained by melt-blending the wholly aromatic polyester consisting of recurring units I, II and III in the above specified contents (denoted as (X)) with an aromatic polyester excluding (X) melt-formable at a temperature below 450° C. (denoted as (Y)) in a weight ratio from 90:10 to 10:90, wherein (Y) should satisfy a condition as follows:

When test specimens of the same shape are obtained by injection molding (X) and (Y) separately, the flexural strength and the flexural modulus of the test specimen obtained from (Y) are at least 10% higher than those of the test specimen obtained from (X) respectively.

DETAILED DESCRIPTION OF THE INVENTION

Figure 1:
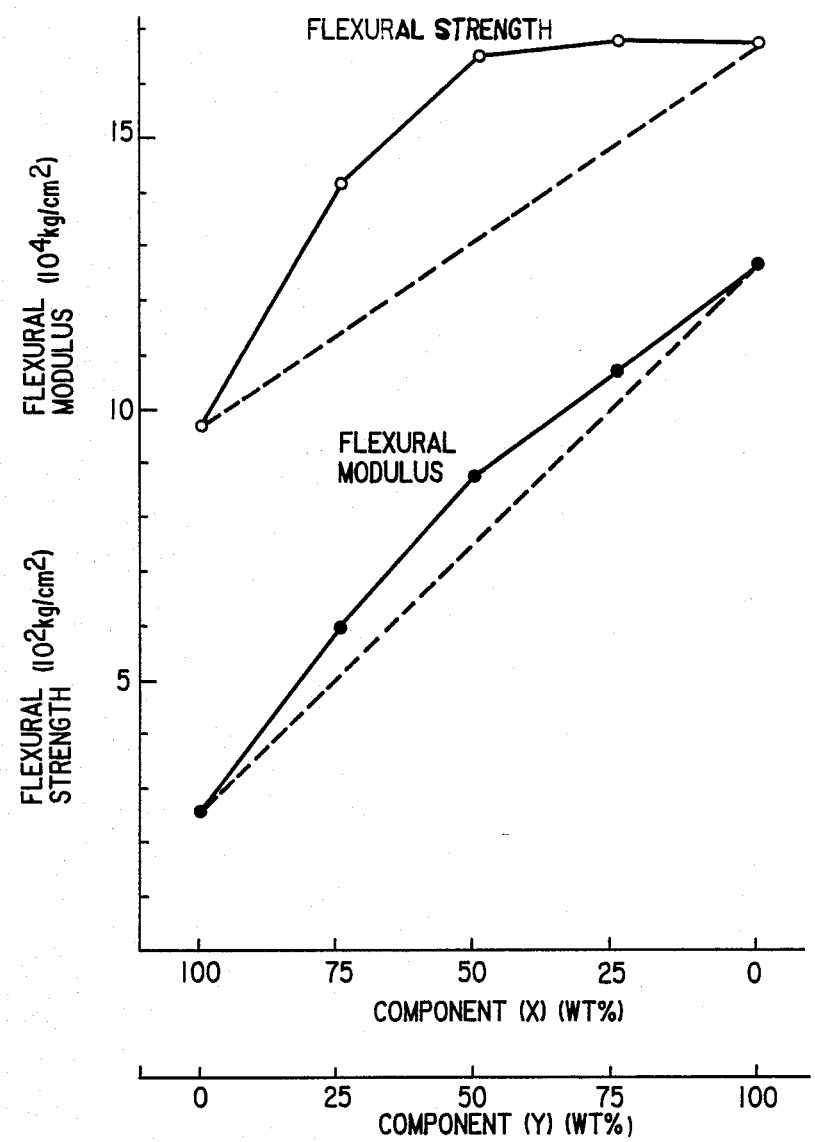
FIG. 1 and FIG. 2 show curves of which one each indicating a relationship between the flexural strength or thee flexural modulus of injection-molded product obtained from a blend of polymers, and the blending composition, found out in Example 4 and Comparative Example 3 respectively. The ordinate represents the flexural strength and modulus. The abscissa represents percentage of the wholly aromatic polyester (X) and an aromatic polyester (Y).

Among the recurring structural units consisting the wholly aromatic polyester of this invention, the unit I is 4-oxybenzoyl moiety and can be derived from-hydroxybenzoic acid or the functional derivatives thereof. The unit I is contained in the polyester in an amount of 45 to 68 mol %, preferably 50 to 65 mol %. The unit II is terephthaloyl moiety and can be derived from terephthalic acid or the functional derivatives thereof. The unit II is contained in the polyester in an amount of 16 to 27.5 mol %, preferably 17.5 to 25 mol %.

The unit III is 4,4'-dioxydiphenyl ether moiety and can be derived from 4,4'-dihydroxydiphenyl ether or the functional derivatives thereof. The unit III is contained in the polyester in an amount of 16 to 27.5 mol %, preferably 17.5 to 25 mol %. The molar amount of the unit II is substantially the same as the molar amount of the unit III.

A part of hydrogen atoms bonded to each aromatic ring of the above units I, II and III may have been substituted with substituted groups including an alkyl group having 1 to 4 carbon atoms, an alkoxy group having 1 to 4 carbon atoms, halogen, a phenyl group and the like. However usually it is preferred that the substituting groups be not present because then obtained polyester has a higher crystallinity and also because formed products obtained from the polyester have higher mechanical properties.

The thermotropic liquid crystal polyester of this invention can be prepared by various condensation reactions, and is usually prepared by melt polymerization. Normally while charging starting raw materials of 4-hydroxybenzoic acid and 4,4'-dihydroxydiphenyl ether giving the unit I and the unit III, of which hydroxyl groups have been converted to lower acyl esters, polymerization is conducted by so-called acidolysis method. Acetate is most preferred as the lower acyl ester.

Though the polymerization may be effected without employing a catalyst, it is often the case that employment of known catalysts in an amount of about 0.001 to 1 wt. %, preferably about 0.005 to 0.5 wt. % to total monomer weight gives a preferred result from the viewpoint of polymerization rate. Mentions are made of examples of the catalysts such as alkaline metal or alkali earth metal salts of carboxylic acids, alkyl tin oxides, diaryl tin oxides, alkyl stannic acids, titanium dioxide, alcoxy titanium silicates, titanium alkoxides, Lewis acid, hydrogen halides, etc.

Melt polymerization is usually effected at a temperature of 200° to 375° C. under atmosphere of an inert gas such as nitrogen or argon, preferably in a stream thereof or under a reduced pressure. As the polymerization proceeds, according to the amount of the distillate and the viscosity of the polymer, the reaction temperature is increased and also the degree of pressure reduction adjusted. The polymerization time is normally in the range from 1 to 10 hours. After completion of the melt polymerization, the resultant polymer is minutely crashed and the polymerization may optionally further be continued at a temperature below the melting point in a solid phase to increase polymerization degree.

The thus obtained polymer is a polyester consisting of recurring units in the substantially same construction as that of charged raw materials. The polyester of this invention consists of the above recurring units of the units I to III in the above specified composition ratios; and the polyester has an inherent viscosity of more than 0.5 dl/g determined in pentafluorophenol solution at a concentration of 0.1 wt./vol. % at 60° C., and forms an optically anisotropic melt phase at a temperature of preferably below 350° C.

The confirmation of the formation of an optically anisotropic melt phase can, as well known by those skilled in the art, be done by observing a thin strip of specimen, preferably one of 5 to 20 μm with a polarizing microscope equipped with a heating stage, under crossed polalizers, to watch the transmission of light at a certain temperature and above. Here by this observation, at high temperatures either applying a light pressure onto the specimen interposed between the cover glasses or applying shear force to the cover glasses will give a surer observation of polarized light. In this observation a temperature at which polarized light starts transmitting is the temperature of transition to an optically anisotropic melt phase. Also this transition temperature can be determined by the positions of endotherms when thermal behavior of a specimen is observed with a differential scanning colarimeter (DSC) at a constant temperature increasing rate, usually at a rate of 10 to 20° C./minute. Since the endotherms of the thermotropic liquid crystal polyester according to present invention observed using a differential scanning calorimeter are much weaker than peaks of crystal melting to isotropic phase of conventional crystalline polymers, much attention should be paid to the observation. Sometimes more than one endotherms are observed, whereby a temperature giving the major peak can be deemed the transition temperature. Also, an annealing of the specimen under a suitable condition sometimes makes clearer the endotherms.

When the transition temperature obtained by observation with a polarized microscope is not identical with that by DSC measurement, the higher temperature is deemed the temperature of transition to an anisotropic melt phase in this invention.

It is necessary for the polyester of this invention to have a temperature of transition to anisotropic melt phase of 350° C. or below from viewpoint of processability and of mechanical properties of formed products to be obtained.

The polyester according to this invention should have an inherent viscosity specified hereinbefore of more than 0.5 dl/g, preferably more than 1.0 dl/g. In the case where the inherent viscosity is lower than 0.5 dl/g, formed products obtained from the polymer do not have sufficient mechanical properties. Though there is no critical upper limit in the inherent viscosity, it is preferred that the inherent viscosity be 10 dl/g or below, preferably 7.5 dl/g or below from the viewpoint of polymerization operation for the polyester, formability of the obtained polyester and mechanical properties of formed products further obtainable from the polyester.

The above specified thermotropic liquid crystal polyester can be injection molded in a conventional manner at a temperature higher than preferably 5° to 100° C. higher than the temperature of transition to an optically anisotropic melt phase, into a formed product having excellent properties. Prior to the injection molding, it is preferred that the polymer be dried at 80° to 150° C.

Since injection molded products obtained from the polyester of this invention have only a small anisotropy in mechanical properties, design of molds and gates is relatively easy. All of conventional molds can be used. Also as the type of gates of molds, conventional gates such as pingate, fangate, submarine gate, film gate, etc. are used. Temperature of a mold is preferably in the range from about 50 to about 150° C. Injection pressure is in the range from 150 to 1500 kg/cm$^2$.

In this invention, it is necessary that the unit III, that is, 4,4'-dioxydiphenyl ether moiety be as described before contained in the polyester in an amount of 16 to 27.5 mol %, preferably 17.5 to 25 mol %. In the case where the unit III exists in an amount less than 16 mol %, as is clear from Comparative Example 1 later described, the impact strength of molded products obtained will be markedly low. And in the case where the unit III is employed in an amount above 27.5 mol %, as is clear from Comparative Example 2 later described, it will be difficult to obtain by melt polymerization a polyester having uniform construction and the obtained polymer will not form at 350° C. or below an optically anisotropic melt phase. Only by using a thermotropic liquid crystal polyester containing the unit III in an amount of 16 to 27.5 mol %, an injection-molded product having a high impact strength can be obtained. The injection-molded product according to this invention shows, when measured for notched Izod impact strength in accordance with ASTM D256, at least 30 kg·cm/cm, usually 50 kg·cm/cm or higher value in the direction parallel to the flow of resin.

In the Example of Japanese Patent Publication No. 20008/1980, there is described a fiber obtained from a thermotropic liquid crystal polyester in which the molar ratio of contained 4-hydroxybenzoic acid/terephthalic acid/4,4'-dihydroxydiphenyl ether derivative is 70/15/15. The fiber is said to increase its strength by heat treatment under a certain condition. However the Patent Publication only discloses a method of heat treatment on a fiber obtained from the thermotropic liquid crystal polyester, and shows only that a fiber is obtained from a polyester consisting of 4-hydroxybenzoic acid/terephthalic acid/4,4'-dihydroxydiphenyl ether and that the fiber increases its strength by heat treatment; and does not describe or even suggest the fact that by injection-molding a thermotropic liquid crystal polyester comprising 4-hydroxybenzoic acid/terephthalic acid/4,4'-dihydroxydiphenyl ether in a certain molar ratio an injection molded product having only a small anisotropy in mechanical properties and having a high impact strength is obtained. Further as clear from Comparative Example 1 later described, the notched Izod impact strength of a molded product obtained by injection-molding a polyester having the composition ratio specified in the above Patent Publication is as low as 2.0 kg·cm/cm, which is far lower than that of the injection molded product according to the present invention.

As described above, as to the impact strength of a molded product, there is a critical ratio of 4,4'-dioxydiphenyl ether moiety in a raw material polyester, and therefore admitting that the above Patent Publication discloses a polyester comprising a 4,4'-dioxydiphenyl ether moiety in an amount of 15 mol %, it is beyond expectation that by injection-molding a polyester comprising 4,4'-dioxydiphenyl ether in an amount of 16 mol % or higher, which range is specified in the present invention, a molded product having only a small anisotropy in mechanical properties and having a high impact strength can be obtained.

This invention also provides a polymeric composition obtained by melt-blending the wholly aromatic polyester consisting of recurring units I, II and III in the above specified contents (denoted as (X)) with an aomatic polyester melt-formable at a temperature below 450° C. (denoted as (Y)) in a weight ratio from 90:10 to 10:90, wherein (Y) should satisfy a condition as follows:

When test specimens of the same shape are obtained by injection molding (X) and (Y) separately, and flexural strength and the flexural modulus of the test specimen obtained from (Y) is at least 10% higher than those of the test specimen obtained from (X) respectively.

By this condition a molded product obtained from a polymeric composition obtained by melt-blending the wholly aromatic polyester (X) with an aromatic polyester (Y) is superior in strength and relatively low in elastic modulus, and has high heat resistance. Besides, when the composition is made into film or fiber, their elongations at break are relatively high.

It is preferred that for the aromatic polyester (Y) an aromatic polyester which forms an optically anisotropic melt phase at a temperature of preferably 450° C. or below, more preferably 400° C. or below be employed from viewpoint of processability and properties of a polymeric composition to be obtained.

The aromatic polyester (Y) should have in usual cases, when determined in pentafluorophenol solution with a concentration of 0.1 wt./vol. %, at 60° C., an inherent viscosity of 0.2 dl/g or higher, preferably 0.5 dl/g or higher, more preferably 1.0 dl/g or higher. In some cases however, depending on the structure of (Y), (Y) does not fully dissolve in pentafluorophenol.

As the aromatic polyester (Y) there are many compounds of different structures. Among them preferred are aromatic polyesters derived from an aromatic hydroxy acid or functional derivatives thereof, from an aromatic or aliphatic dicarboxylic acid or functional derivatives thereof, from an aromatic or aliphatic dihydroxy compound or functional derivatives thereof; and particularly preferred is an aromatic polyester which forms an optically anisotropic melt phase. Examples of such polyester are an aromatic polyester consisting of 6-hydroxy-2-naphthoic acid and 4-hydroxybenzoic acid (U.S. Pat. No. 4,161,470); an aromatic polyester excluding the wholly aromatic polyester (X), consisting of 6-hydroxy-2-naphthoic acid, 4-hydroxybenzoic acid, an aromatic dihydroxy compound and an aromatic dicarboxylic acid (U.S. Pat. Nos. 4,256,624, 4,473,682 and 4,522,974); an aromatic polyester excluding the wholly aromatic polyester (X) consisting of 6-hydroxy-2-naphthoic acid, an aromatic dihydroxy compound and an aromatic dicarboxylic acid (U.S. Pat. No. 4,256,624); and aromatic polyester consisting of 6-hydroxy-2-naphthoic acid, an aromatic dihydroxy compound, cyclohexyldicarboxylic acid and an aromatic dicarboxylic acid (U.S. Pat. No. 4,318,842), an aromatic polyester obtained by reacting a polyester prepared from an aromatic dicarboxylic acid and aliphatic diol, with an aromatic hydroxy compound derivative (U.S. Pat. No. 3,778,410); an aromatic polyester prepared from phenylhydroquinone and an aromatic dicarboxylic acid (U.S. Pat. No. 4,159,365).

An injection-molded product obatined from the wholly aromatic polyester (X) is, as described before, compared with an injection-molded product obtained from a wholly aromatic thermotropic liquid crystal polyester which have so far been proposed, low in strength and elastic modulus and the properties are close to the strength and the elastic modulus of an injection-molded product obtained from a polymeric compound such as polyethylene terephthalate or polycarbonate which does not form liquid crystal phase. However, in an injection-molded product obtained from a melt-blended composition of a polymeric compound which does not form liquid crystal with the wholly aromatic polyester (Y), both the strength and the elastic modulus decreases on account of incorporation of the polymeric compound which does not form liquid crystal far lower than the weighted average of the each one.

Melt blending of the wholly aromatic thermotropic liquid crystal polyester (X) with the aromatic polyester (Y) is effected at a temperature higher than that where (X) and (Y) melt, that is, in a range from about 260° to 450° C., preferably about 280° to 400° C., by a conventional method using a mixing kneader, monoaxial extruder or biaxial extruder. The melt blending is carried out usually for 1 minute to 1 hour, preferably for 3 minutes to 30 minutes.

The polymeric composition according to the present invention can readily be formed by conventional methods into various formed products such as fiber, film, injection-molded product, etc. Further in the case of the above various formed products, particularly of fiber and film, by conducting heat treatment at a temperature below the temperature causing sticking of the fibers or the films with each other while removing off generated byproducts, the mechanical properties can still be increased. The period of the heat treatment is selected from the range from 1 minute to about 50 hours.

Various fillers and/or reinforcing agents may be added to the wholly aromatic thermotropic liquid crystal polyester of the present invention or to the blend of said polyester with the aromatic polyester (Y) of this invention to increase properties of the obtained formed products. For example incorporation of glass fiber or carbon fiber, etc. can increase mechanical properties and thermal characteristics of the products, particularly injection-molded product, formed from the compositions. The amount of fillers and/or reinforcing agents incorporated is about 10 to 600 weight parts per 100 weight parts of the polymeric composition.

The present invention will be elucidated hereinbelow more concretely referring to Examples.

EXAMPLES

Example 1

Into a separable flask of 1-liter capacity equipped with a stirrer, a gas inlet, a distillation head and a condenser, 226.8 g (1.26 moles) of 4-acetoxybenzoic acid, 69.72 g (0.42 mole) of terephthalic acid, 120.12 g (0.42 mole) of 4,4'-diacetoxydiphenyl ether and 0.01 g of sodium acetate as catalyst were charged. Then the flask was thoroughly purged of oxygen by evacuation and refilling with dry nitrogen three times, and thereafter dipped in a bath kept at 250° C. while passing dry nitrogen gas stream at a rate of about 3 l/hour. After the content of the flask began melting and became a slurry, stirring was started and the content was kept at the above temperature for 50 minutes. Then the bath temperature was raised to 280° C. over a period of about 10 minutes, and kept at the temperature for 50 minutes. Further the bath temperature was raised to 320° C. over a period of about 10 minutes and kept at the temperature for 50 minutes. Up to this time 112 ml of acetic acid distilled off. Next, the inside of the flask was gradually evacuated to 20 mmHg over a period of 10 minutes. Thereafter the bath temperature was raised to 340° C., and the polymerization was continued while the inside pressure was kept at 0.3 mmHg. After 40 minutes from starting evacuation, stirring was ceased and nitrogen gas was introduced to make the inside atmospheric pressure, followed by cooling of the flask. The content of the flask was taken out before it solidified completely. The yield of the obtained polymer was 260 g. After pulverizing the polymer, drying in vacuo was done at 130° C. for 10 hours. The thus obtained polymer showed an inherent viscosity of 2.62 dl/g when determined in pentafluorophenol solution with a concentration of 0.1 wt./vol. % at 60° C. The inherent viscosity $\eta_{inh}$ is calculated by the following equation:

$$\eta_{inh} = l_n t/t_o/c$$

wherein,
$t_o$: dropping time of solvent, pentafluorophenol measured at 60° C. in Uberohde viscometer
$t$: dropping time of solution having dissolved the specimen
$c$: concentration (g/dl) of the specimen solution.

When observation was made on a thin strip of this polymer with a polarized microscope under crossed polarizers while raising the temperature of the specimen at a rate of 10° C./min. in a heating stage (TH-600, Linkam Company) in nitrogen gas atmosphere, the specimen started transmitting light at 284° C. and the amount of light transmission became still greater at about 307° C., proving that the polymer formed an optically anisotropic melt phase. Also measurement with DSC (Metler TH3000) after annealing the polymer at 270° C. for 15 minutes, at a temperature raising rate of 20° C./min. gave an endotherm at 286° C.

The polymer was subjected to a measurement by 500 MHz $^1$H-NMR (JEOL GX-500) in a mixed solution of pentafluorophenol-trifluoroacetic acid, and it was confirmed that the polymer had essentially the same construction as that of charged raw materials.

Weight loss measurement of the obtained polymer under air atmosphere using a thermo-balance (Differential Thermal Balance, RIGAKU ELECTRIC) disclosed that the weight started reducing at 411° C. and the weight loss up to 500° C. was only 4.9 wt %.

The obtained polymer was formed, with an injection molding machine (TK14-1AP, TABATA MACHINERY) at a cylinder temperature of 320° C., under an injection pressure of 800 kg/cm² and using a mold equipped with a film gate, at a mold temperature of 100° C., into pieces of injection-molded product. Pieces each of 75×15×2 mm in which the longitudinal axis is parallel to the direction of polymer flow (MD) and in which the longitudinal axis is perpendicular to the direction of polymer flow (TD) respectively were obtained by specially designed gate. The thus obtained molded products were subjected to measurements for the flexural strength and flexural modulus according to ASTM D790 and for notched Izod impact strength according to ATM D256. The results are shown in Table 1.

Further Vicat softening point was measured according to ASTM D1525 to give 233° C.

The molded product had a surface luster and a very smooth surface.

Examples 2 and 3

Polymerizations were conducted in a manner similar to that described in Example 1, by charging 4-acetoxybenzoic acid, terephthalic acid and 4,4'-diacetoxydiphenyl ether in molar ratios of 55/22.5/22.5 and 64/18/18 respectively. The obtained polymers showed inherent viscosities of 2.74 gl/g and 2.68 dl/g, respectively. Observation with a polarized microscope and measurement with DSC proved that the polymers formed optically anisotropic melt phases at and above a temperature of 290° C. and 292° C. respectively.

Mechanical properties of the injection-molded products obtained in the same manner as in Example 1 are shown in Table 1.

Comparative Example 1

Polymerization was conducted in a manner similar to that described in Example 1, by charging 4-acetoxybenzoic acid, terephthalic acid and 4,4'-diacetoxydiphenyl ether in a molar ratio of 70/15/15. The obtained polymer showed an inherent viscosity of 2.68 dl/g and formed, when observed with a polarized microscope, an optically anisotropic melt phase at about 325° C.

The polymer was injection-molded in the same manner as in Example 1, except for that the cylinder temperature was 340° C. Mechanical properties of the obtained molded product are shown in Table 1. As apparent from Table 1, the impact strength of the molded product obtained from the polyester having above composition is remarkably low.

Comparative Example 2

Polymerization was conducted in a manner similar to that described in Example 1, by charging 4-acetoxybenzoic acid, terephthalic acid and 4,4'-diacetoxydiphenyl ether in molar ratios of 40/30/30. When evacuation was started at 320° C., the viscosity inside the system started increasing remarkably; and after about 20 minutes when the bath temperature was raised to 350° C., the content solidified to render further stirring impossible. The bath temperature was then raised up to 370° C., where the content did not melt. The obtained polymer was very brittle and showed a sharp endotherm at 505° C. This polymer is not formable at 400° C. or below.

Example 4

As the aromatic polyester (Y), a wholly aromatic polyester represented by the formula below was synthesized according to a published literature from 60 mol % of 6acetoxy-2-naphthoic acid, 20 mol % of terephthalic acid and 20 mol % of hydroquinone diacetate.

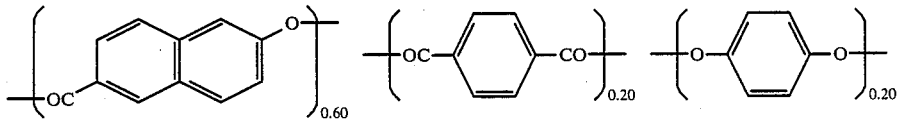

The inherent viscosity, measured in the same way as in Example 1, of the obtained polymer was 3.81 dl/g, and it was confirmed that this polymer formed an optically anisotropic melt phase at and above 290° C.

Then, the wholly aromatic thermotropic liquid crystal polyester (X) obtained in Example 1, was melt-blended with (Y) in weight ratios of 75:25, 50:50 and 25:75 respectively. The melt blending was conducted with Plastgraph made by Brabender Company, at a temperature of 310° C. and at a rotation rate of 60 rpm for 5 minutes. The obtained polymeric compositions, the wholly aromatic polyester (X) and the aromatic polyester (Y) were subjected to injection molding separately. The thus obtained specimens were measured for flexural strength and flexural modulus both in the direction parallel to the flow of resin. The results are shown in Table 2.

TABLE 2

| Component(X) | Component(Y) | Flexural strength | Flexural modulus |
|---|---|---|---|
| (weight %) | | (kg/cm²) | (kg/cm²) |
| 100 | 0 | 970 | 2.60 × 10⁴ |
| 75 | 25 | 1410 | 5.90 × 10⁴ |
| 50 | 50 | 1638 | 8.59 × 10⁴ |
| 25 | 75 | 1664 | 10.6 × 10⁴ |
| 0 | 100 | 1656 | 12.5 × 10⁴ |

The flexural strengths and the flexural moduli of the molded product of each composition were summarized in FIG. 1.

It is seen that while the strength of a molded product of blend of (X) and (Y) lies in a position higher than the weighted average of the strengths of individual molded products of (X) and (Y), the elastic modulus corresponding to the blend is relatively lower. Vicat softening points of the test specimens from the blends are all 233° C. or higher proving that they are also superior in thermal characteristics.

Comparative Example 3

Instead of the wholly aromatic polyester (X), a polycarbonate which does not form liquid crystal (TAFLON A3000 made by IDEMITSU PETROCHEMICAL) is blended in the same way as in Example 4 with an aromatic polyester (Y) represented by the formula:

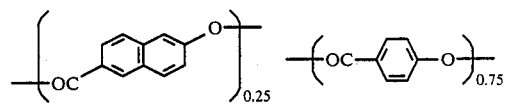

and the blend was injection-molded. The properties of the obtained test pieces are shown in Table 3.

TABLE 3

| Polycarbonate | Component(Y) | Flexural strength | Flexural modulus |
|---|---|---|---|
| (weight %) | | (kg/cm²) | (kg/cm²) |
| 100 | 0 | 870 | 2.20 × 10⁴ |
| 75 | 25 | 910 | 3.13 × 10⁴ |
| 50 | 50 | 950 | 4.50 × 10⁴ |
| 25 | 75 | 1013 | 6.73 × 10⁴ |
| 0 | 100 | 1656 | 12.5 × 10⁴ |

Figure 2:
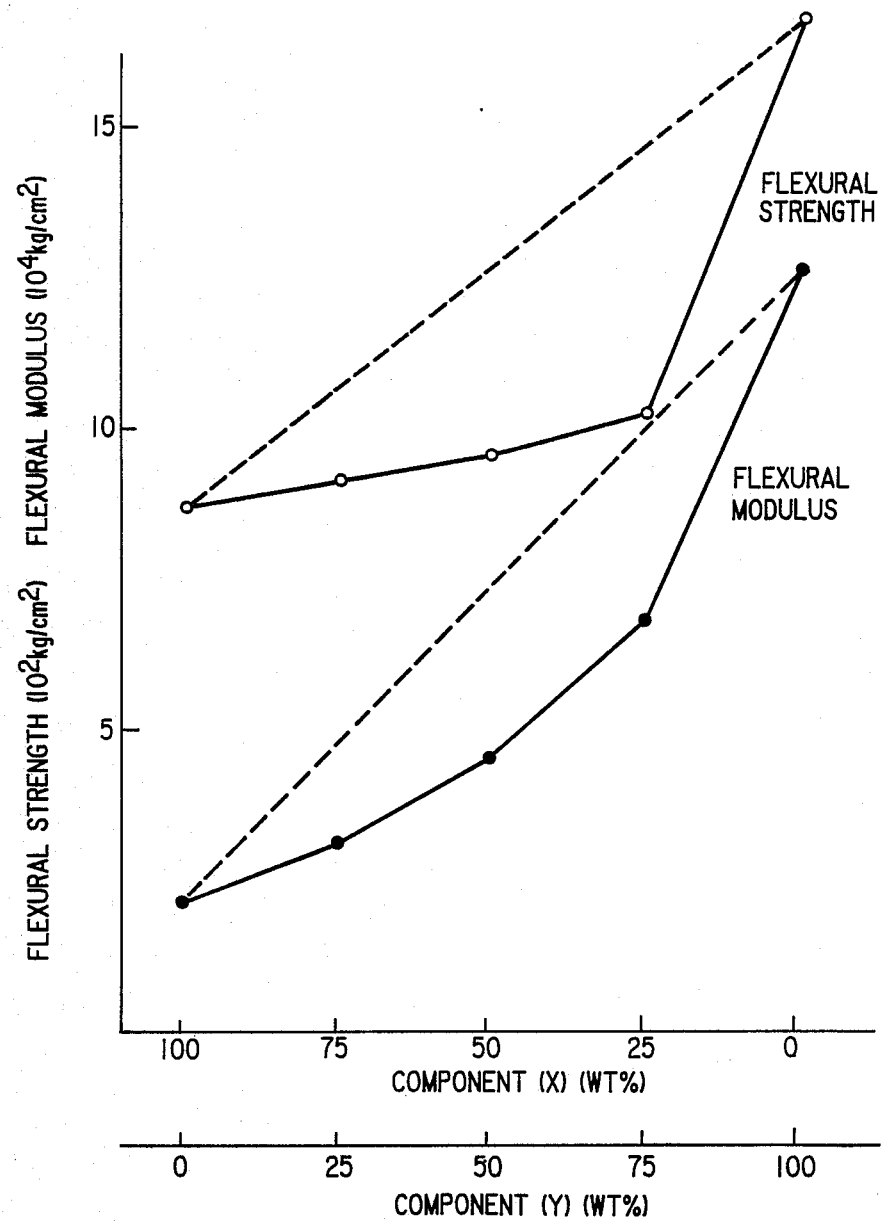

The constructions of the polymeric compositions and their flexural strengths and flexural moduli are shown in FIG. 2. It is understood that while the strength and the elastic modulus of the specimen obtained from polycarbonate only are close to those obtained from the wholly aromatic polyester (X) only, those of specimen obtained from a blend of polycarbonate with the aromatic polyester (Y) is much lower than the weighted average.

TABLE 1

|  | Molar ratio of HBA/TPA/DHE[1] | Properties in the machine direction | | | Properties in a direction perpendicular to the machine direction | | |
| --- | --- | --- | --- | --- | --- | --- | --- |
|  |  | Flexural strength kg/cm$^2$ | Flexural modulus kg/cm$^2$ | Notched Izod impact strength kg · cm/cm | Flexural strength kg/cm$^2$ | Flexural modulus kg/cm$^2$ | Notched Izod impact strength kg · cm/cm |
| Example 1 | 60/20/20 | 979 | $2.61 \times 10^4$ | 111 | 605 | $1.55 \times 10^4$ | 60 |
| Example 2 | 56/22/22 | 960 | $2.42 \times 10^4$ | 120 | 600 | $1.50 \times 10^4$ | 60 |
| Example 3 | 64/18/18 | 1081 | $3.12 \times 10^4$ | 74 | 772 | $1.81 \times 10^4$ | 37 |
| Comparative Example 1 | 70/15/15 | 660 | $2.90 \times 10^4$ | 2 | 511 | $1.21 \times 10^4$ | 0.4 |

[1]Molar ratios of 4-acetoxybenzoic acid (HBA), terephthalic acid (TPA) and 4,4'-diacetoxyiphenyl ether (DHE).

We claim:

1. A thermotropic liquid crystal polyester consisting essentially of recurring units from I, II and III, said recurring units being unsubstituted or each recurring unit being substituted with at least one substituent selected from the group consisting of $C_{1-4}$ alkyl groups, $C_{1-4}$ alkoxy groups and halogens:

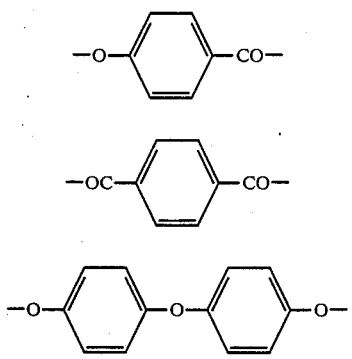

wherein the unit I is contained in the range from 45 to 68 mol %, the unit II is contained in the range from 16 to 27.5 mol %, the unit III is contained in the range from 16 to 27.5 mol %, and the unit II and the unit III exist in substantially the same amounts; said polyester having an inherent viscosity, when determined in pentafluorophenol solution with a concentration of 0.1 wt./vol % and at 60° C., of 0.5 dl/g or higher, and forming an optically anisotropic melt phase at a temperature below 350° C.

2. A thermotropic liquid crystal polyester as defined in claim 1, wherein the unit I is contained in the range from 50 to 65 mol %, the unit II is contained in the range from 17.5 to 25 mol % and the unit III is contained in the range from 17.5 to 25 mol %.

3. A thermotropic liquid crystal polyester as defined in claim 1, wherein aromatic rings contained in the recurring units from I, II and III are not substituted.

4. A thermotropic liquid crystal polyester as defined in claim 1, wherein a part of hydrogen atoms bonded to each aromatic ring of the recurring unit I, II or III have been substituted with at least one or more of a substituting group selected from a group consisting of an alky group having 1 to 4 carbon atoms, an alkoxy group having 1 to 4 carbon atoms, and halogens.

5. A thermotropic liquid crystal polyester as defined in claim 1, wherein said polyester has an inhedrent viscosity of 1.0 to 10 dl/g when determined in pentafluorophenol solution with a concentration of 0.1 wt./vol. % at 60° C.

6. An injection-molded product characterized in that the injection molding of the thermotropic liquid crystal polyester as specified in claim 1 is conducted at a temperature above the temperature of transition of said polyester to an optically anisotropic melt phase.

7. An injection-molded product according to claim 6, characterized in that the thermotropic liquid crystal polyester as specified in claim 1 contains the recurring unit I in an amount of 50 to 65 mol %, the recurring unit II in an amount of 17.5 to 25 mol % and the recurring unit III in an amount of 17.5 to 25 mol %.

8. An injection-molded product according to claim 6, characterized in that the recurring units contained in the thermotropic liquid crystal polyester as specified in claim 1 are not substituted.

9. An injection-molded product according to claim 6, characterized in that in said thermotropic liquid crystal polyester as defined in claim 1 a part of hydrogen atoms bonded to each aromatic ring of the recurring unit I, II or III have been substituted with at least one or more of a substituting group selected from a group consisting of an alkyl group having 1 to 4 carbon atoms, an alkoxy group having 1 to 4 carbon atoms, and halogens.

10. An injection-molded product according to claim 6, characterized in that said thermotropic liquid crystal polyester as defined in claim 1 has an inherent viscosity of 1.0 to 10 dl/g when determined in pentafluorophenol solution with a concentration of 0.1 wt./vol. % at 60° C.

11. A polymeric composition prepared by melt-blending the wholly aromatic polyester (X) as defined in claim 1 with an aromatic polyester (Y) having components whose construction is not identical with that of (X) and being melt-formable at 450° C. or below, in an weight ratio of 90:10 to 10:90.

12. A polymeric composition as defined in claim 11, wherein (Y) is further specified as that when test specimens are obtained by injection-molding (X) and (Y) separately, the flexural strength and the flexural modulus of the specimen obtained from (Y) are at least 10% higher than those of the speciment obtained from (X) respectively.

13. A polymeric composition as specified in claim 11, characterized in that the aromatic polyester (Y) is capable of forming an optically anisotropic melt phase.

14. An injection molded product characterized in that the polymeric composition as defined in cliam 11 is injection-molded at a temperature higher than the temperature at which each component melts.

15. A fiber obtained by melt-spinning the polymeric composition as defined in claim 11.

16. A film obtained by melt-extruding the polymeric composition as defined in claim 11.

17. A composition comprising 100 weight parts of the thermotropic liquid crystal polyester according to claim 1 and about 10 to 600 weight parts of a filler and/or a reinforcing agent.

18. A molded product obtained by injection molding the composition according to claim 17.

19. A composition comprising 100 weight parts of the polymeric composition according to claim 11 and about 10 to 600 weight parts of a filler and/or a reinforcing agent.

20. A molded product obtained by injection molding the composition according to claim 19.

21. A thermotropic liquid crystal polyester consisting essentially of recurring units from I, II and III:

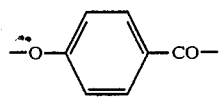
I.

II.

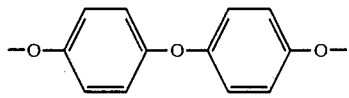
III.

wherein the unit I is contained in the range from 45 to 68 mol %, the unit II is contained in the range from 16 to 27.5 mol %, the unit III is contained in the range from 16 to 27.5 mol %, and the unit II and the unit III exist in substantially the same amounts; said polyester having an inherent viscosity, when determined in pentafluorophenol solution with a concentration of 0.1 weight/vol % and at 60° C., of 0.5 dl/g or higher, and forming an optically anisotropic melt phase at a temperature below 350° C.

22. An injection-molded product characterized in that the injection molding of the thermotropic liquid crystal polyester as specified in claim 21 is conducted at a temperature above the temperature of transition from said polyester to an optically anisotropic melt phase.

* * * * *